US006539402B1

(12) United States Patent
Sorenson et al.

(10) Patent No.: US 6,539,402 B1
(45) Date of Patent: Mar. 25, 2003

(54) USING PERIODIC SPACES OF BLOCK ID TO IMPROVE ADDITIONAL RECOVERY

(75) Inventors: Ellen L. Sorenson, Mounds View, MN (US); David M. Ciminski, Roseville, MN (US); Monica M. Langsford, Roseville, MN (US)

(73) Assignee: Unisys Corporation, Blue Bell, PA (US)

(*) Notice: Subject to any disclaimer, the term of this patent is extended or adjusted under 35 U.S.C. 154(b) by 0 days.

(21) Appl. No.: 09/510,425

(22) Filed: Feb. 22, 2000

(51) Int. Cl.[7] .............................................. G06F 12/00
(52) U.S. Cl. ........................... 707/202; 714/15; 714/16; 714/17; 714/19; 714/20; 711/161; 711/162
(58) Field of Search .................................. 707/202, 204; 714/15, 16, 17, 19, 20; 711/161, 162

(56) References Cited

U.S. PATENT DOCUMENTS

| | | | | | |
|---|---|---|---|---|---|
| 4,530,054 A | * | 7/1985 | Hamstra et al. | ............. | 365/228 |
| 5,043,866 A | | 8/1991 | Myre, Jr. et al. | ........... | 364/200 |
| 5,193,162 A | * | 3/1993 | Bordsen et al. | ............. | 707/202 |
| 5,291,600 A | * | 3/1994 | Lutz et al. | ..................... | 714/15 |
| 5,325,519 A | * | 6/1994 | Long et al. | ..................... | 714/15 |
| 5,404,508 A | * | 4/1995 | Konrad et al. | ............. | 707/202 |
| 5,551,043 A | * | 8/1996 | Crump et al. | ............... | 713/323 |
| 5,561,795 A | | 10/1996 | Sarkar | ........................ | 395/600 |
| 5,625,815 A | * | 4/1997 | Maier et al. | .................... | 707/8 |
| 5,734,817 A | | 3/1998 | Roffe et al. | ................. | 395/182 |
| 5,740,433 A | * | 4/1998 | Carr et al. | .................. | 707/201 |
| 5,884,328 A | * | 3/1999 | Mosher, Jr. | ................. | 707/202 |
| 5,940,826 A | | 8/1999 | Heideman et al. | ............ | 707/8 |
| 5,949,970 A | | 9/1999 | Sipple et al. | .......... | 395/182.13 |
| 6,070,177 A | * | 5/2000 | Kao et al. | ................. | 707/901 |
| 6,079,000 A | | 6/2000 | Cooper et al. | ............. | 711/162 |
| 6,085,200 A | * | 7/2000 | Hill et al. | ................... | 707/202 |
| 6,161,198 A | * | 12/2000 | Hill et al. | ................... | 707/202 |
| 6,324,548 B1 | * | 11/2001 | Sorenson | .................... | 707/203 |

* cited by examiner

Primary Examiner—John Breene
Assistant Examiner—Leslie Wong
(74) Attorney, Agent, or Firm—Michael B. Atlass; Mark T. Starr; Charles A. Johnson (57) ABSTRACT

Audit Trail recovery is enhanced by including addresses of immediately prior periodic saves of all active or open Steps or transactions in each new period save area. Reduced cost in main memory usage and on-the-fly processing to accomplish audit trail format that enhances recovery time results from ability to immediately address next prior period save data once a last periodic save is found in reading back the audit trail. Reading back the audit trail to find the last periodic save can be avoided too by directly addressing the last periodic save in preferred embodiments since the computer system will in all events temporarily maintain a record of the address of the last periodic save to record the next time a periodic save is to be made, so this temporarily maintained record can be accessed and used to jump directly to the last periodic save address on the audit trail. Accordingly all periodic saves prior to the current one are readily discovered and the earliest open transaction or Step is thus located quickly, allowing the audit trail based recovery to initiate quickly.

20 Claims, 8 Drawing Sheets

USING PERIODIC SPACES OF BLOCK ID TO IMPROVE ADDITIONAL RECOVERY

FIELD OF THE INVENTION

This invention relates to the field of audit trail storage and recovery and has particular application to systems of auditing databases.

BACKGROUND OF THE INVENTION

Large or rapidly accessed database performance in real time has become a business tool of necessity in communications, electronic commerce, and as support for processes in many other forms of commerce. Thus, the ability to recover quickly from a system or partial system failure has become a weak link in the chain of support for computing and communications systems which run the data bases to support commerce and communications. The importance of quick recovery is underscored by the fact that many systems have been designed to allow operations during recovery by an audit system. Such a system is described in U.S. Pat. No. 5,734,817, issued to Roffe et al., and its disclosure incorporated herein in its entirety by this reference.

Currently, many database servers have tape storage audit trails, and the tape systems are typically running very quickly, say, filling a tape in 12 minutes or less, to accommodate large amounts of data needed for recovery. The records are typically stored in "audit blocks" of fixed or variable length, depending on the system, and several thousand of them can be stored per second. The tape and other audit systems will also typically have system status saves stored on regular intervals selected by the audit program or audit program manager. These records may be stored in the form of audit blocks, (and we call such blocks "P-Saves" for "periodic saves" of system data for the remainder of this document).

Thus, it is required to search through the audit blocks in order to find from where to begin the reconstruction process so that a database can be restored to its state prior to the crash. This restoration will cause any records which may have been opened, or opened and partially operated upon, or opened, partially operated upon left not closed, to be set to an appropriate state or any exceptions issued where necessary. (A transaction process that is completed is sometimes called a completed "step". A step is a term that will be used frequently herein each of these operations would be viewed as such a "step". The importance of this term will become apparent within.) It is easy to understand that such reconstruction and restoration are critical functions in financial transactional databases. Thus, for a bank or other commercial operation to be unable to accomplish such restoration work very quickly is anathema to their business success since all operations of such a compromised database should be put on hold until the recovery is complete. To do otherwise would be to risk the credibility of the data integrity in the whole system, and the business (or other operations) which depends on such records being accurate.

The tape storage systems which contain most modem audit data are typically optimized to run forwards while making recordings at a rapid continuous rate, and consequently, actually operating them to recover from a failure instead requires them to run in non optimized modes, introducing delays in recovery time which can be hours long. Part of the delay is introduced in reading each audit data block, determining what is in it, then backing up (reversing) the tape to the next previous block, reading it, determining what is in it, and so on, until all open items or incomplete transactions are discovered. Only then can a reasonable system proceed to read the entire tape forward to once again read the audit blocks and reconstruct the activity occurring at the time of the failure so that the failure can be corrected or appropriately accommodated. Such wait times before beginning recovery can be extremely significant, risking the real time commercial or communications activities for which the databases are used. Also, positioning near the end of the tape may be time consuming due to the size of the latest tape storage systems. However, positioning near the end of the tape for many of these latest tape storage systems is required to start a search for all activity in progress at the time of the system failure.

To illustrate by way of a few examples, consider the functioning of a large widely distributed Automatic Teller Machine network, or a major airline reservation system, or a check clearing operation. If the system has a failure which requires a shutdown for 6 hours to recover, that would be catastrophic to the business operations of the teller network, the airline or the check clearing system. Also, in systems that may require relatively frequent transfers of large pieces of data, such as video records, the time frame in which a particular record is open or being transferred is potentially much larger. Thus, in such systems also, recovery would require resort to many blocks of storage in an audit trail to discover the point in the audit record at which the recovery process should begin. (The restoration and recovery processes are commonly performed by another automatic system commonly called an executive or recovery executive program, the details of which are not required for an understanding of the instant invention. Unisys sells such programs under the name IRU or Integrated Recovery Utility, currently.)

Mass storage, or disk storage, may be significantly faster in recovery time cost, because paging through the audit trail to find records of incomplete or corrupted transactions will be quicker than with tape. Nevertheless, mass storage systems still introduce significant lag time in the piecing together of the audit record blocks which are relevant to the particular problems outstanding in a failure, because they require many individual seeks and reads to find the relevant starting point for recovery. In a large data base which turns over data many times in a short period or which has extended periods during which a particular record may be operated on, the thousands of audit records to be reviewed to find the initial activation/opening/call to/writing of a particular record can thus still take an unacceptably significant amount of time. Further, the current cost of disk storage is far higher than tape storage. Also, the time and effort required for transferring the data to a longer term storage type, for example tape media, should also be factored in.

In the context of using mass storage for audit trail information, U.S. Pat. No. 5,561,795 (Sarkar), incorporated herein by this reference, describes a system of keeping a time for the beginning of a transaction (that is, one affecting each of several cached pages of a database) and storing it updated every time the cache audit trail is being written to the non-volatile (mass) storage. Sarkar requires a transaction control table from which the oldest uncommitted transaction can be found. In a system with thousands of on-going transactions, therefore each one would require entries in this table in order for it to be useful in establishing an audit trail in accord with Sarkar's invention.

Myre Jr., et al in U.S. Pat. No. 5,043,806 also incorporated herein by this reference, is cited by Sarkar as prior art. Myre et al., stored a periodically determined earliest uncompleted transaction Log Sequence Number (LSN) and an earliest uncommitted transaction LSN. This, in turn was an improvement of the art before Myre which merely stored all uncompleted transition and uncommitted transaction LSN's. Myre, like Sarkar, required reference to a transaction table to determine the earliest LSN's of relevance. Both would store the earliest open transaction during the equivalent P-SAVE operations in creating the audit trail. What is problematic about that is that the time and tape or mass storage locations of the earliest open transaction (or step) has to be saved, and therefore kept in the transaction table, wasting a great deal of main memory real estate. This in turn lowers the ability of the whole computer system to function, relative to the required storage size and makes audit trails expensive.

Therefore, in the absence of such constant record keeping which requires significant main memory resources, a Myre-like system would require finding every periodic save (P-SAVE) of the records of open transactions (or steps) until all the steps initiation points can be accounted for on the audit trail prior to doing a recovery. Especially in taped-based audit systems, reading backwards is extremely time intensive to recovery without a Sarkar-like system and can become commercially unviable.

Accordingly there is great commercial need for a method or system to speed up examination of audit record blocks preparatory to restoration of a database to a fully operative condition, and at the same time does not require much if any storage area in main memory or processing overhead to implement.

Further, it has remained extremely economical, relative to other forms of mass storage, to employ magnetic tape drives for storing large amounts of data that may only occasionally be used. The current tape drive technology can record very quickly, but readback in the direction opposite from recording is very slow due to their optimization for fast recording. Accordingly, an audit trail recording system adapted specifically and optimized for such tape systems are another unmet commercial need.

SUMMARY OF THE INVENTION

A system and method are described providing for expediting restoration and/or recovery in situations where a transactional system or database may require resort to audit trail records. It employs an asymmetrically nested location indicator system that can be employed by an executive recovery program to get to the earliest "step" that has not been committed to prior to the crash (or other event requiring a reconstruction or recovery). It can be thought of as a system employing a series of opportunely located and conveniently generated pointers to the start of any open action items (uncommitted steps and uncompleted steps), thus enabling a recovery executive program to begin recovery operations expeditiously, without requiring maintenance in main memory or in any cache a record of the location and/or time of each step that is active and completed.

DETAILED DESCRIPTION OF THE PREFERRED EMBODIMENTS

An understanding of this invention will be had by first reviewing how tapes and mass storage systems record audit records in an audit trail and how such records are typically recovered. It is also useful to understand the particulars of the transactions involved in the real world that underlay the audit trail process.

Figure 1:
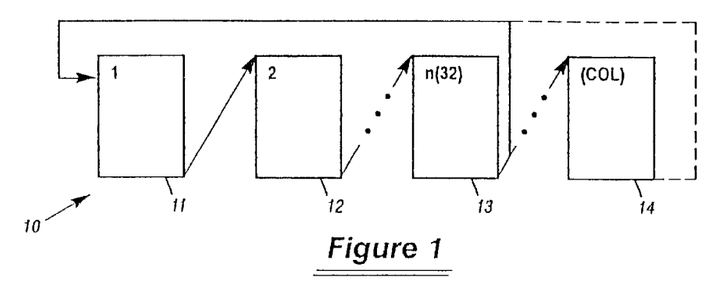
FIG. 1 illustrates in block diagram form, the logical organization of audit blocks in a typical mass storage system that can be used with this invention.

Accordingly, refer now to FIG. 1 which illustrates the logical organization of audit blocks of memory in a typical mass storage system which can be used with this invention. In a typical system a limited number of audit files in mass storage, such as files 11, 12, 13, and 14, are available for the storage of the audit trail in that mass storage. At the beginning of each file an identifier is stored. (Here the identifier is illustrated as 1, 2, n(32), and (eoL). It should be noted that in systems produced by the assignee of this patent, a file is also called an "F-cycle"). The identifier should identify the name of the file and/or its address on the mass storage medium. In an exemplary system the number of audit files available in the rotating queue is on the order of about 32 although hundreds of files or more may be allocated for this activity if required under certain circumstances. Thus, in this illustration the file numbered 13 is 30 audit files away from the file 12. Through various available schemes this logical distance can be accommodated if desired in other mass storage as audit trail files on mass storage are usually transferred to a more permanent media, for example, tape, after a specific amount of time to free up the mass storage for more audit trail files. The end of each audit file in the series will have a pointer to the beginning of the next file in the series. Typically, these files can vary in size between less than 100 words to hundreds of thousands of words. If the end of the series of blocks is reached and the programmer or controller of the audit trail feature is set up to do it, the programmer or controller may allocate other space in other mass storage devices or tape reader systems into which these blocks of data may be stored longer term, therefore extending the length of the audit trail indefinitely if desired. One method and system for writing audit records to an area of non-volatile memory is described in U.S. patent application Ser. No. 09/001,136 (RA-5075), in the application entitled, XPC BACKUP FOR IN-PROGRESS AUDIT, by Cooper, Hill, Konrad and Nowatzki, and assigned to the assignee hereof, and which is hereby incorporated by this reference in its entirety. Another system for storing audit information which includes both a master and a slave outboard memory device is described in U.S. Pat. No. 5,940,826, and failure features of such a system are described in U.S. Pat. No. 5,949,970; both of which are also incorporated herein in their respective entireties, by this reference. Thus, it should be recognized that there are diverse systems for storing audit trail information.

Figure 2:
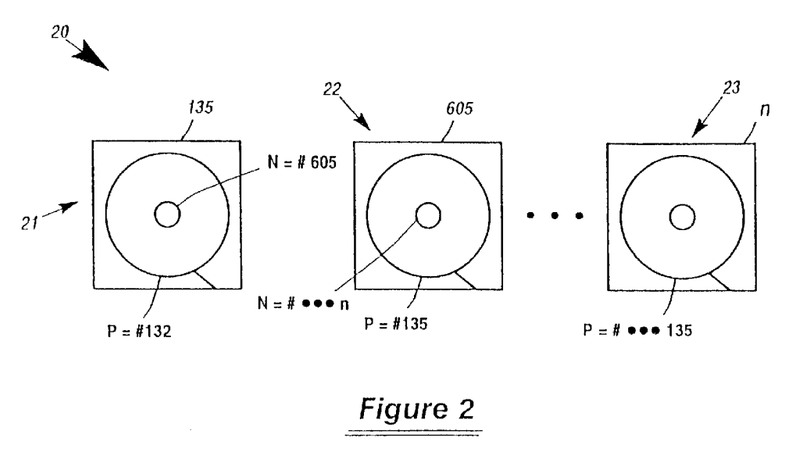
FIG. 2 is a drawing of a series of tape cartridges used in audit trail data storage for use with this invention.
Figure 3:
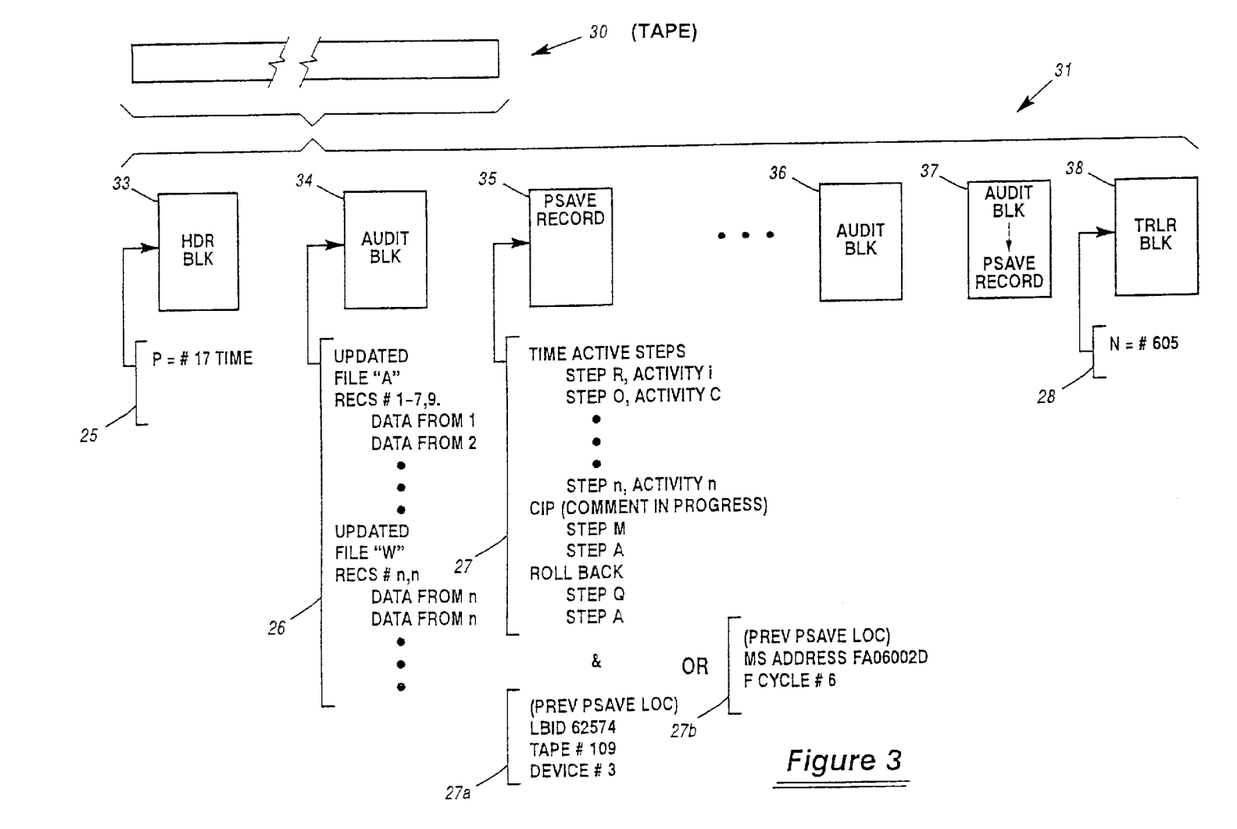
FIG. 3 is a multi level heuristic block diagram of data blocks in an audit trail in accord with a preferred embodiment of this invention.

In FIG. 2 a series 20 of tape cartridges 21, 22, and 23, are shown having identification numbers 135, 605, and n, respectively. The previous tape's number in a series of audit trail tapes is recorded at the beginning of each subsequent tape in the series, and the next tape in the series is identified at the end of the preceding tape cartridge. Thus, the entire series of data recorded across the series of tapes can be located in sequence similarly to the way data is recorded in audit trail files as described above. Here, a tape numbered 132 (P=#132 may be recorded) was previous in the recording series to the tape numbered 135. Thus, 135 is recorded at the start of tape 132. For the next tape 605, the number 135 is recorded since 135 was directly preceding tape 605. And the tape n follows the tape 605 as can be seen in the P numbers and N numbers identified at the bottom of the Figure. Likewise at the end of each tape, the next tape numbers shall be written, this having "605" at the end of tape 135; "n" at the end of 605, and so on. Thus, the large data files in mass storage in the series or the tapes themselves need to be organized such that they each contain a header block and a trailer block with a pointer to the previous end and next tape or file, respectively. In FIG. 3 a large magnetic tape 30 (which could also represent a file of memory storage on a magnetic disk drive) is seen to contain a header block 33 and a trailer block 38 identifying the previous file on mass storage and the next file on mass storage, or the previous tape and the next tape, respectively. Thus, in the tape example, the P (previous tape) number is 132. The time that the tape was started will also be recorded in the header block as information 25. Time data may be used for other purposes as well in perfecting a recovery of data or finding a spot in an audit trail, and may be used to enhance recovery operations. The system will store data in Audit Blocks, like blocks 34 and 35 illustrated here. There will likely be a very large number of blocks like 34 and 36 in any given file like tape 132 illustrated here or one of the files like 11 of FIG. 1. There will be a relatively small number of P-SAVE records like 35 and 37. (In Audit block 35, the P-SAVE record takes up the whole audit block since in the preferred embodiment, we will begin a next audit block when a P-SAVE is made. A more typical audit block with a P-SAVE record would be like that in block 37, where the block size is only somewhat truncated with the occurrence of a P-SAVE. Clearly, one can organize these blocks as is convenient for the particular system, even designating unique block types for P-SAVES if desired without going outside the scope of the ideas presented here). The P-SAVE records will only be generated at particular times selected by the executive program maintaining the audit trail. Depending on the number of transactions or size of the modifications being made or both, the executive (or a programmer/user) may select different amounts of time between storage of P-SAVE blocks. The first block of data, Data Block 34 in the data record 31 on tape 30, contains the type of information kept in an information record, here in the information record identified with numeral 26. Here, a file called A was updated by making changes to records identified by numbers 1–7 and 9 and the data from these records is also stored. (These data can be before-look or after-look, it matters not for the purposes of this discussion. The data from these records may be the data that was stored previous to the transaction (or step) or after the transaction (or step) depending on the way the programmer has set up the system. For some detail on what before look, that is, previous to the transaction, and after look, that is, after the transaction, records contain and how such a system works, refer to U.S. Pat. No. 5,682,527, Cooper, et al., incorporated herein in its entirety by this reference. In most systems expected to use this invention only before-look or after-look records will be stored in the audit trail. The Sarkar reference appears to require or expect storage of both before and after-look records. Use of either a before-look or after-look only audit system like in the Cooper reference or of a system that stores both would be supported by our inventions.) Thus, a complete record of the transactions occurring in a database is being kept.

In the next block of data 35, here a P-SAVE block, the audit trail system has (in a preferred system) stored a time stamp for when this P-SAVE was made. It will contain an indication of which steps are active, including what commits are in progress, and what rollbacks may be in progress at this time stamp P-SAVE point. (In preferred embodiment systems we do not keep rollbacks, but this may be desirable depending on the methods applied to restoration of a database chosen). All this information may be wanted to recover from a failure. (The name or other identifier of the step will be recorded only since the actual information was already stored in the audit blocks.) The P-SAVE does not store data on the time and location of the earliest currently active step. It will also contain locations and time data too, preferably for the last previous P-SAVE. FIG. 3 will be referred back to later to describe more details of how the invention operates.

An understanding of the concepts of steps, commitments, and rollbacks is useful here as well as a description of the milieu of which the inventions operates.

Figure 4:
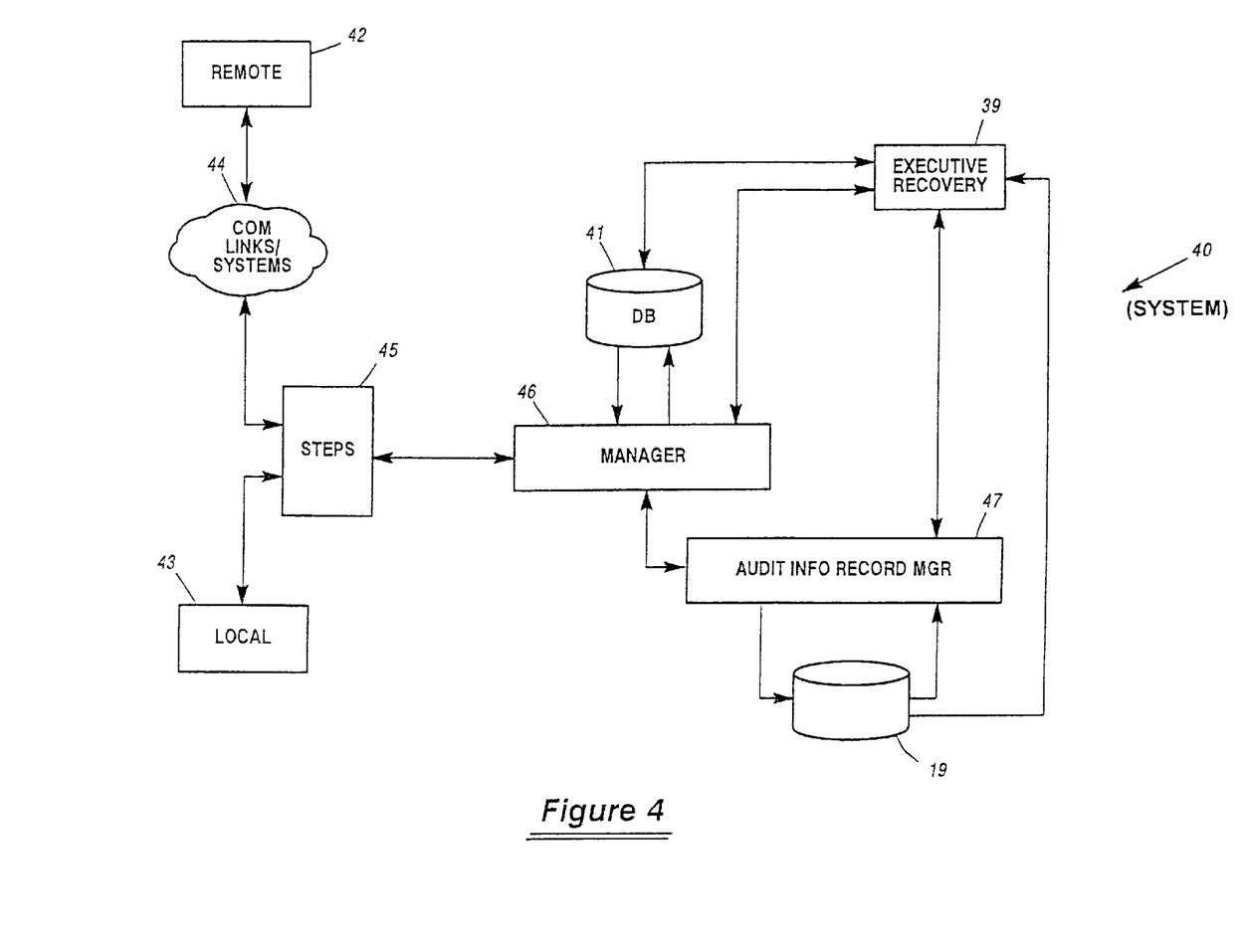
FIG. 4 is a block diagram of the basic components of a system in accord with a preferred embodiment of the invention. .

Referring now to FIG. 4, in which such a system 40 is illustrated, the database 41 is here assumed to be in a single location although distributed databases may also enjoy the fruits of this invention. A manager program 46 operates on the data in the database system in accord with requests from remote 42 and local 43 user information systems. The series of communications links and systems through which a remote user may employ the database is here illustrated simply as a cloud 44. Any operation that a user might employ to change data in the database would be considered a step. Because steps occur between the manager program and the users, steps are illustrated as area 45. The manager program 46 will log every activity it takes in relation to the data in the database 41 by recording it through an audit information record manager program 47. This information record manager program 47 will simply organize the data so that it appears in a manner consistent with that illustrated in FIG. 3 when it is recorded there. (There may be cache records made in an intermediate time frame for other types of recovery if desired, this is not relative to this invention.)

If there is a failure in the operation of the system which requires a recovery, an executive recovery program 39 must be available to manipulate either or all of the database information, the program manager, and the audit information manager in order to effectuate a recovery. The audit information manager 47 will control its own records 19 in preferred embodiments.

Figure 5A:
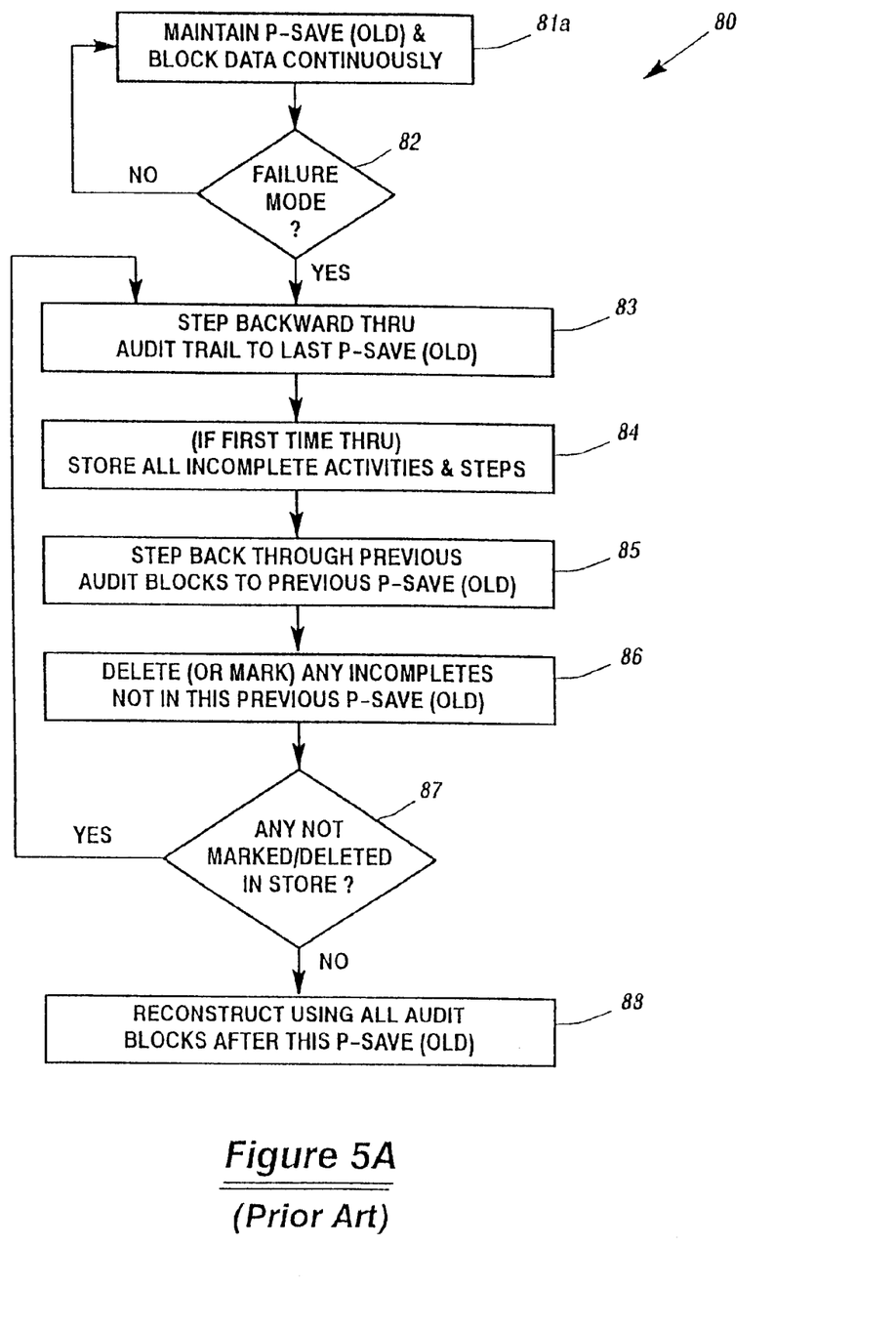
FIGS. 5A and B are flow charts related to prior art systems.

A process for getting to the point where the executive recovery program 39 could force a repair of the data in the database 41 so that none of the open transactions (open steps) would be lost, is illustrated in FIG. 5A. The process 80 assumes continuous periodic saves of transaction information and P-SAVE data by the audit information record manager 47 blocks of data, and the P-SAVES make a periodic saving of the state of any open, also known as active, Steps. In general terms, a Step is started when a user or a process requests that something be done to some data within the database. A Step ends when that something that was started to be done or requested to done is completed and the record in the database being operated on is closed. Thus the process step 81 of continuously auditing database transaction Steps continues until some failure mode 82 is detected. Assuming that the system wants the recovery to proceed, the first step is to step backward through the audit trail to find the last P-SAVE 83. The data in the P-SAVE will, as previously described, contain the identity of each Step that is currently active and any commits in progress. ("A Commit in Progress" would be where a request has been made to apply the database updates. In other words, the Step has requested the system to apply the updates). It could also contain the identity of any rollbacks in progress if the system is tracking these (a rollback is a process of a user operating on a record which has been temporarily committed to but wishes to change the temporary commitment before making a full commitment or restoring the values to their current status without making the change). A rollback is just another kind of action a Step would take. All this audit information needs to be available to the executive recovery program. These identified open Steps will then be reviewed and worked through as the executive recovery program steps back through all of the audit trail data until no active processes (Steps, commits in progress, (or rollbacks if used)) that were found in the last recorded P-SAVE are discovered in what will be the final P-SAVE of the search to begin recovery. Actually, in the preferred embodiment in order to properly restore the database, an executive program will be preparing to do the next P-SAVE after each last one is stored. This next to be saved P-SAVE will contain the address of the last saved P-SAVE, so if the executive's memory is available, it will contain any Steps started after the last P-SAVE and the address of the last P-SAVE. Therefore, the actual record of open Steps and active processes that the system needs to look through will be found in the executive memory, or an audit trail it is writing to if it fails, and the last P-SAVE the location of which is found in the executive memory also. With reference to FIG. 4, the executive memory can be assumed to be managed by the Audit Info Record Manager 47 and be contained in the audit trail data memory 19, although any number of alternatives are available given the configuration of the system and software in which the invention will be used.

In large scale transaction processing systems and systems in which records may be open for a very long period of time, this stepping back through an audit trail may require the stepping back through thousands of small audit blocks which in the case of a tape drive audit trail system may require many hours of time to complete since modern tape systems do not read back quickly. A shorter but also significant period of time would be required to complete a similar search by stepping backward through the audit blocks in a mass storage audit trail system.

The process just described is similar to the one described by the Myre patent referred to above.

Figure 5B:
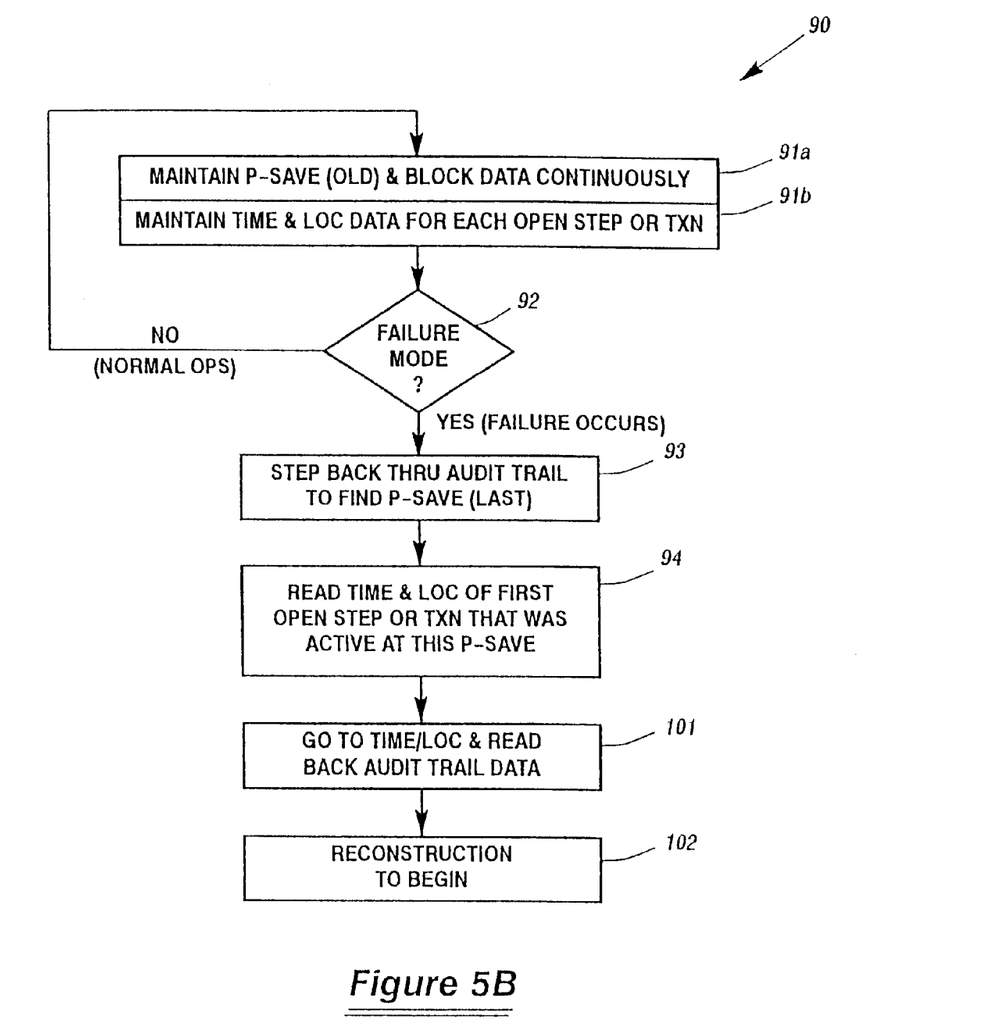

In FIG. 5B, a system similar to the Sarkar patent's system is summarily illustrated in flow chart 90. Here, the records kept for each step or transaction will be extensive, and in Sarkar-type systems will be quite necessary in order to reach back to the earliest transaction. If the audit blocks in a system using Sarkar's ideas are not recycled into a relatively small set of blocks, such that additional storage units or tapes might be required to keep a complete audit record, in addition to the information Sarkar teaches to store, a way to find out which piece of storage medium the earliest open transaction (or step) must additionally be kept. But ignoring this limitation for the purposes of this discussion, the flow diagram becomes relatively simple in the Sarkar-like system. When failure occurs 92, such a system merely has to step back through the audit blocks on the trail until the last P-SAVE is found 93. Then it can read 94 the address of the audit block with the earliest transaction (or step) on it and go directly 101 to the address or time stamp or both at which that audit block is stored. Then it can and read back in all audit blocks subsequent to that 101 and begin recovery 102.

Our system is both more complex and more simple. It does not require storage of location or time data for any open transactions or steps, and yet it can find the right medium and right audit block for the earliest transaction much more quickly than a Myre-like system.

Fortunately for the audit trail recovery system that can employ the instant invention, an additional piece or group of data has been made available which is unavailable from any other systems. P-SAVES in accord with this invention will have the records of segment 27a/b (FIG. 3) containing a hard reference to an actual previous P-SAVE location. Since the amount of storage used between P-SAVES by an audit trail will vary widely (since it is based on the usage volume which itself is widely varying in commercial environments), saving the time stamp of the last P-SAVE is not particularly helpful in finding it. And this saving of data on exact location will require minimal overhead since only an address (and tape number or other block I.D.) is required, instead of transaction/step I/O's plus unique addresses for each open Step in a P-SAVE period.

Typically, the ID's of the incomplete activities in steps discovered in step 84 of process 80 (FIG. 5A) could be marked as not found or deleted from the store in step 86 when they are not found in the next P-SAVE discovered by stepping back through the audit trail. Thus, when the P-SAVE and step identify storage held by the executive recovery program is either empty or completely marked off, step 87 allows the executive recovery program to begin to reconstruct using all the audit blocks that occur after the very last P-SAVE in which the last remaining unmarked or undeleted step or activity was initiated. Other algorithms could be used to note that no further active Steps exist, of course.

Figure 6:
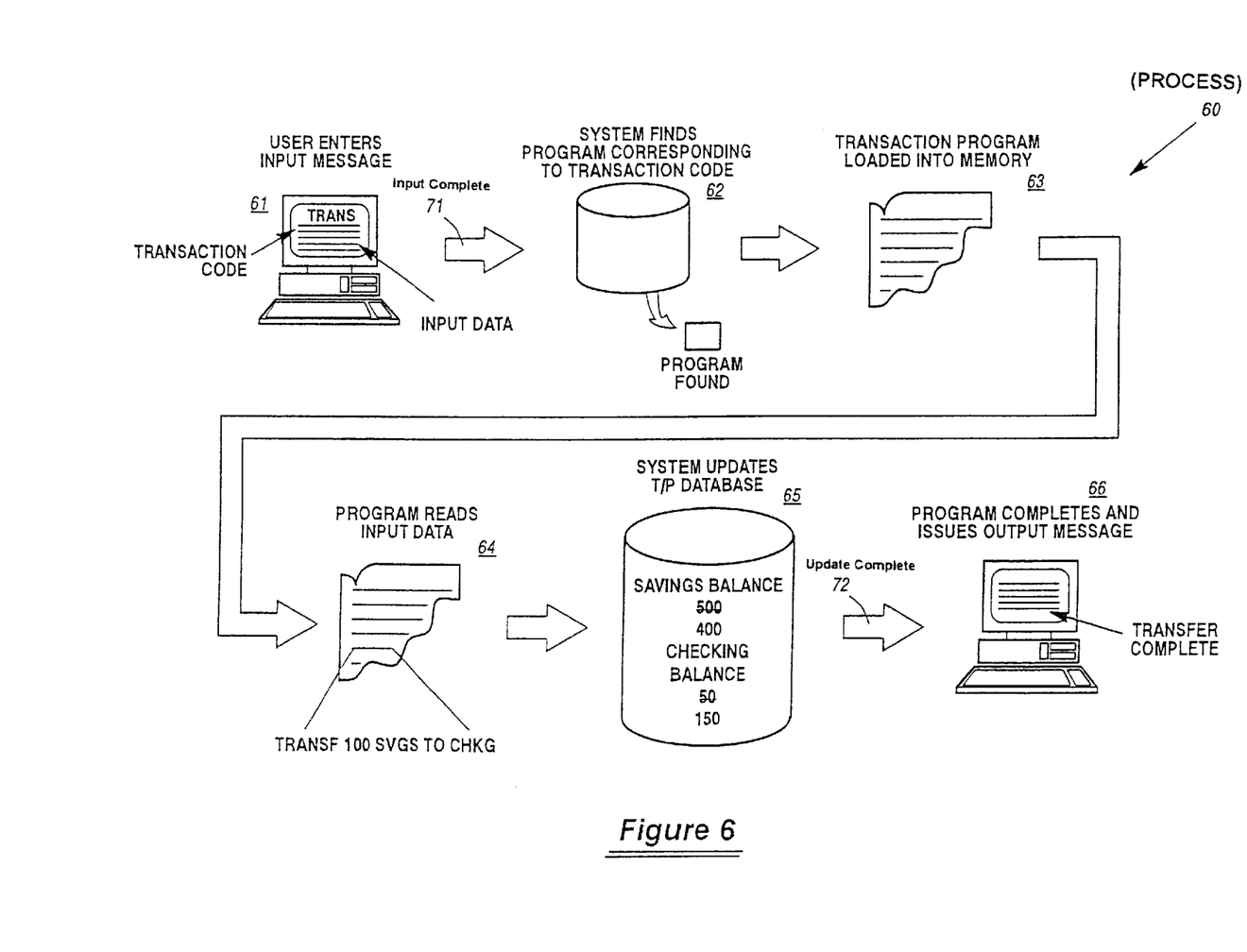
FIG. 6 is a block diagram of an example transaction process using a database.

Please refer to FIG. 6, which illustrates a process 60 by which a user's account record can be modified in the transaction processing system. The first step in this process 61 has the user entering an input message with a transaction code to transfers funds from a savings account into a checking account. This would begin an exemplary step as the word step has been used previously in this document. In step 62 the database manager (manager 46 of FIG. 4) finds the program corresponding to the transaction desired by the user. The transaction program is loaded in to memory in step 63 and program read the input data from the user in step 64. In step 65 the program causes the system to update the transaction processing database so that the checking balance is increased and the savings balance decreased by the same amount. Sometime after this when the message is sent that the process has been complete in step 66, the end of the step is accomplished at point 72. Depending on the program, a rollback may require the initiation of a new transaction or may occur within step 66 if the program asks for confirmation from the user before step 65.

Figure 5C:
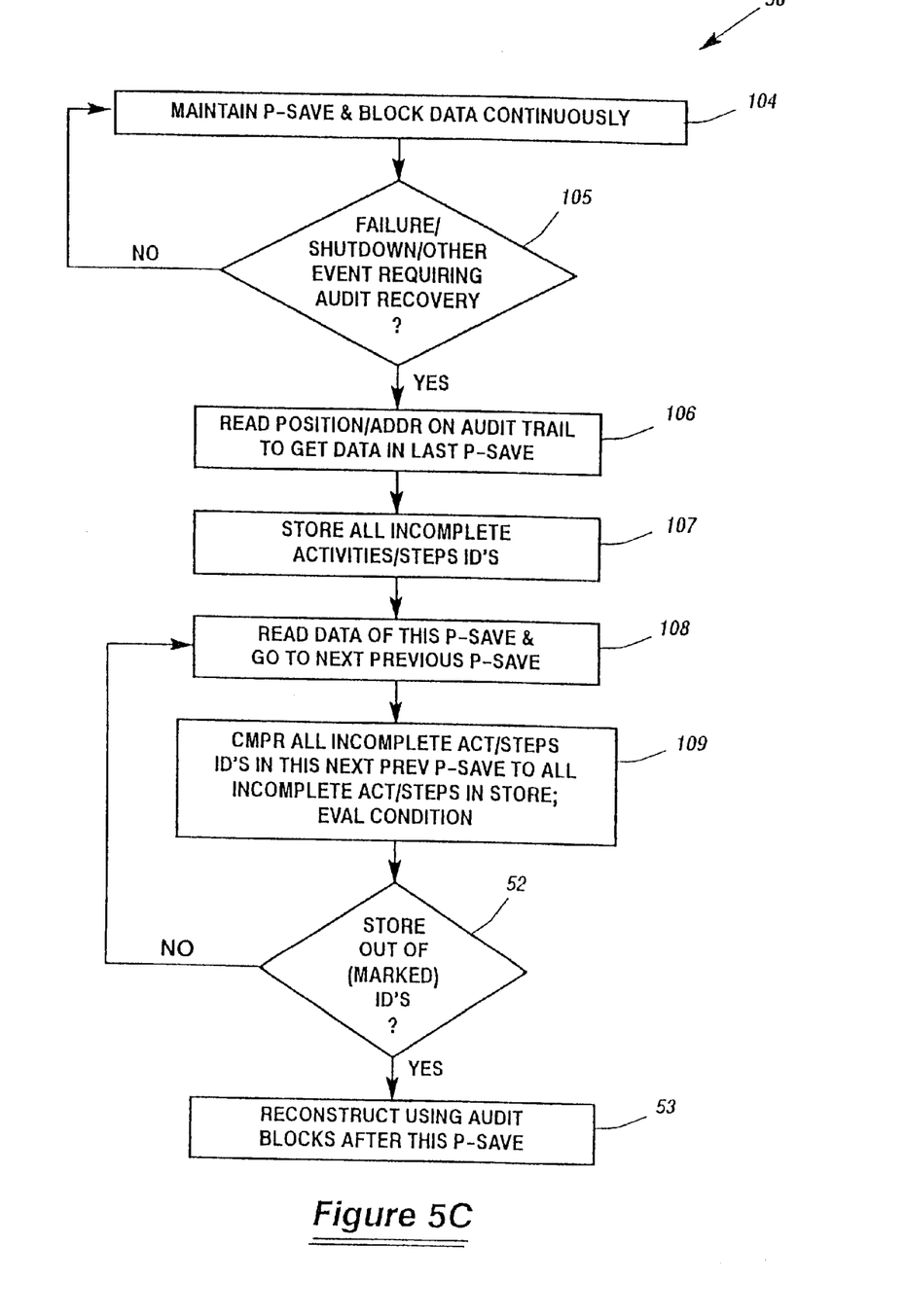
FIG. 5C is a flow chart illustrating a preferred embodiment operation of the invention.

Refer now to FIG. 5C in which the inventive processes is described in flow chart 50. Again, it is assumed that the system will maintain P-SAVE's and block data continuously through the use of some kind of audit information record manager program. This will continue to occur until some kind of failure mode occurs 105. Again, the executive recovery program will step backward through the audit trail to find the last P-SAVE in 106.

What is different however is that in the inventive process, the audit record information manager program has saved additional data to the P-SAVE data block. This data will be used to avoid the process entirely of discovering where the next P-SAVE previous to the current P-SAVE is within the stream of data blocks in the audit trail. It will not immediately locate the earliest needed P-SAVE, but it will allow for pointing back or "linking" to the last P-SAVE, and sequentially the one before, and the P-SAVE before, until all the open steps in the last recorded P-SAVE are found.

Refer now to FIG. 3 once again. In the tape drive audit trail system, the previous P-SAVE location is identified in the P-SAVE block 35 in information area 27A. Here the audit block ID number is recorded as well as the tape number and preferably the device type which uses that tape. (Whichever identifiers are used for tapes, they should produce the ability to uniquely identify an individual tape). The block ID number goes to the exact position on the tape and in current tape drive systems may be found with great rapidity.

If the audit trail is recorded within the series of files in a mass storage system, the previous P-SAVE location is stored in information area 27b of a P-SAVE block like P-SAVE block 35. This additional information would then include the mass storage address and preferably the F cycle number, file number or other unique identifier that is the file name.

Thus, in FIG. 5C, step 108, the process will read the location stored for the previous P-SAVE in the current P-SAVE and the system can then be directed immediately to the previous P-SAVE. Step 109 compares all the incomplete activities and step identifications that were located in the newly found P-SAVE that was just directly located to all the incomplete activities in steps in the executive recovery programs storage. Again, in step 109, steps that are no longer found to be open or incomplete are either deleted or marked. (Alternatively, and perhaps preferably, in none of the active Steps originally stored are found when a new P-SAVE is read, we can declare that this is the last P-SAVE needed). A determination is then made 52 of whether there are no remaining incomplete activities or steps or whether they have all been marked. If we have some remaining incomplete or open steps we return to step 108. If there are none remaining then we can proceed to step 53 allowing the executive recovery program to perform its function of recovering the data in the database that has been subjected to open or incomplete steps.

To do a complete recovery, since there is a constant audit trail being maintained and recorded immediately after each P-SAVE by the audit trail management program, usually in cooperation with an executive, the data that may have been put into play by Step activity following a P-SAVE can also be accounted for. If the memory controlled by the executive program is available, it will contain the direct address of the last P-SAVE, thus the step 106 can go directly to that P-SAVE for that part of the complete picture of the audit trail. For the next P-SAVE the executive will be monitoring transactions or Steps as well, so any newly active Steps will be available from that memory also. Likewise this information should be available on the audit trail in each audit trail block written after the last P-SAVE was written, so the manager program will forward and update incomplete activities/step IDs with information on audit trail until end of audit trail resulting in a list of incomplete activities/step IDs at time of system failure. This and the last P-SAVE list comprise the list of incomplete activities/Step ID s in step 107.

Figure 7:
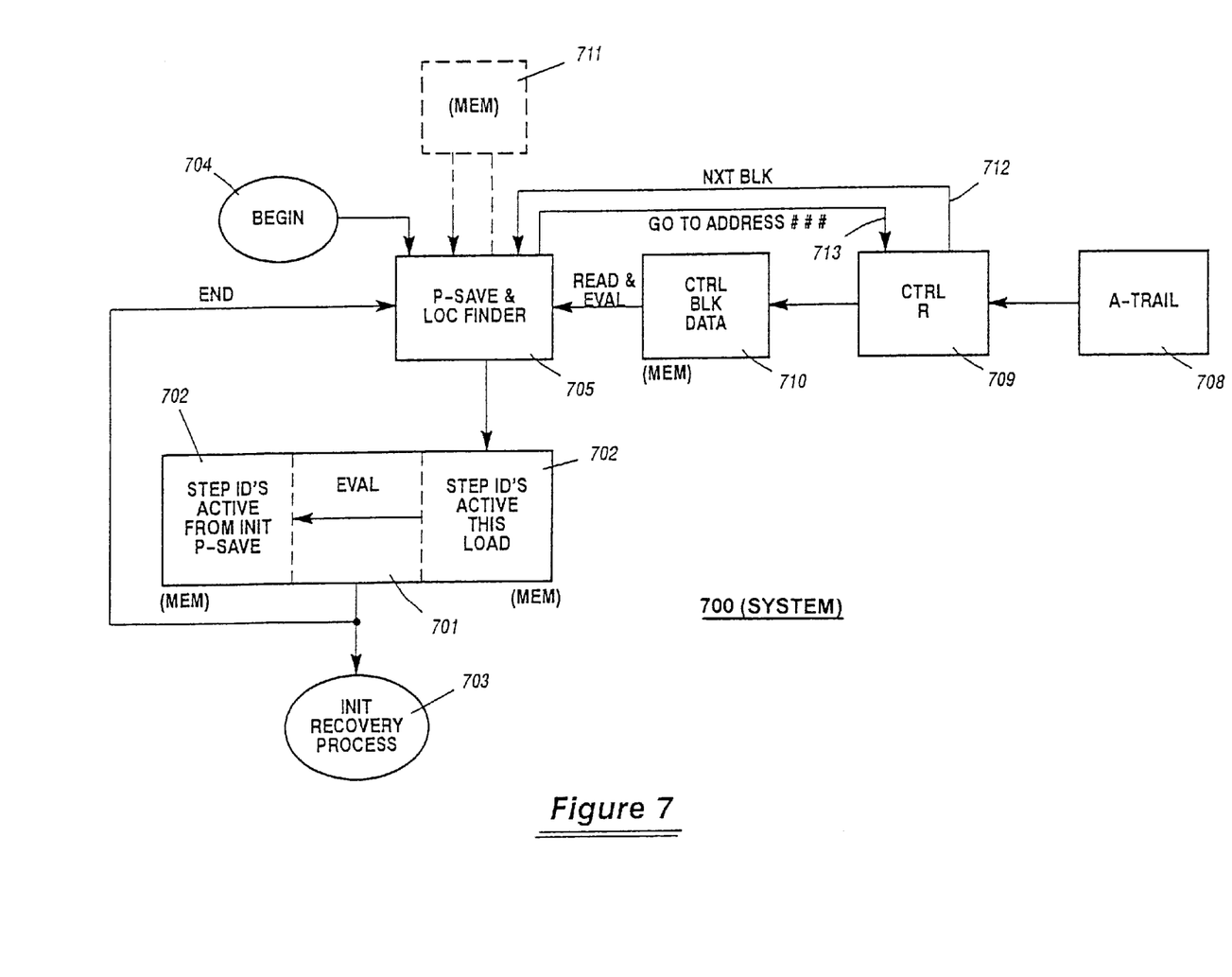
FIG. 7 is a block diagram of components used with a preferred embodiment system.

In FIG. 7, a system 700 for finding the place in the audit trail to begin recovery is shown in heuristic block diagrammatic form. The elements act upon request caused by an automatic notification or manual notification that the computer system supporting the active data base processing has in some way failed and that a recovery is required by sending a begin 704 signal. The manager 705 (preferably an IRU) will initiate a read operation through the memory controller 709 that controls reading and writing with the memory system 708 that stores the audit trail. In the preferred system where the last P-SAVE address is accessible through an executive program's memory as described earlier, the read operation is directed immediately 713 to that P-SAVE address. Otherwise, the manager will have to go back (712) through each data block until it finds a P-SAVE block among the data blocks read into a piece of the computer system memory 710 that it controls. Under either system, the manager (705) will then initiate a storage and compare operating and evaluation program 701. This program 701 will keep track of which Step IDs are active, by keeping a record of which Step IDs that were active in the initial loading (taken from the data in the first found P-SAVE, together with any additional active Steps from the executive memory 711 in the preferred embodiment). It has an area of memory (702) to hold all the initially loaded Step ID data, and an area or way to use to check it against any new Step ID data found in subsequently located P-SAVES, The evaluation program (701) is for managing a memory area (702) (which is illustrated in two pieces because the memory area may be discontinuous) of said computer system for storing any active Step IDs therein, and for generating an initiate recovery signal (703) and terminating its own execution as soon as there are no active Step IDs in the memory area. The evaluation program begins execution (704) by storing all active Step IDs found (705) in a last written P-SAVE record into the memory area (702) and deactivates each said active Step ID as a copy of each said active Step ID is not found in each previously written P-SAVE data block.

When no more of the first loaded Step ID's are found in any subsequent loading, that last review of a P-SAVE's data will trigger the end of the manager program's execution and cause a signal to be sent so that recovery can begin 703 at that last checked P-SAVE address.

The invention just described is believed to be limited only to the following appended claims.

What is claimed is:

1. Method of reading an audit trail record prior to restoring data in a database system comprising:
   a. locating a last P-SAVE record on an audit trail,
   b. reading data in said last P-SAVE to determine which Steps or transactions are either incomplete or uncommitted,
   c. producing a retained record of all said incomplete or uncommitted Steps or transactions,
   d. reading the address of a previous P-SAVE from within data in said last P-SAVE,
   e. moving directly to the address of a previous P-SAVE from the last P-SAVE location,
   f. checking the information in said previous P-SAVE record to determine which of said all incomplete or uncommitted Steps or transactions in said retained record produced in step c are also incomplete or uncommitted in this previous P-SAVE, g. if there are no incomplete or uncommitted transactions or Steps in said previous P-SAVE, allowing restoring of data in said database to begin, else, iterate from step d until there are no incomplete or uncommitted transactions or Steps.

2. The method of claim 1 in which said address reading includes reading a direct data location or data storage record medium.

3. The method of claim 1 wherein said locating step comprises, reading backward along the audit trail until a last saved P-SAVE record is located.

4. The method of claim 1 wherein said locating step comprises, reading an address for a last P-SAVE from an active Step/transaction memory and directly accessing said last P-SAVE at said address.

5. The method of claim 4 wherein audit data on said audit trail is also read to complete said record of all incomplete or uncommitted Steps or transactions in step c.

6. Method of storing information into an audit trail for use by a computer system which runs a database which contains data to be maintained by reference to said audit trail in event of failure in said computer system, said audit trail storing method comprising:

continuously recording into an audit trail record, blocks of information desirable to have for a recovery of said database onto said audit trail, periodically recording an identification record of all incomplete Steps to a periodic save (P-SAVE) record in a location among said audit trail record blocks in said audit trail record, recording the location of said P-SAVE record within said audit trail record in a next P-SAVE block.

7. The method of claim 6 wherein said recording step recording said identification record into a P-SAVE record records all incomplete Steps' names.

8. A system of audit trail record keeping for storing data on an audit trail for use with a large database having numerous database records to recover integrity of said large database's records when desirable to do so, wherein said database may be operated upon by user access to any said database records processor called Steps in which Steps employ a database manager operating on said database and wherein a system for storing step ID codes or names of active Steps is operating to maintain said database integrity, and wherein said Steps are opened upon a request for access to a database record and are closed upon completing of any action with respect to said request and wherein said system for storing step ID codes or names provides an indication of completed Steps, said system comprising:

An audit information record manager for monitoring every user initiated Step affecting said database records in the database and for generating an audit record of each said Step, and for writing said audit record to an audit trail, said audit information record manager comprising a monitor path for monitoring said database manager wherein data from said monitoring path is used by said audit information record manager to generate a record for each said Step that requests access of any database record, via said database manager, Said audit information record manager further comprising a process for writing each said audit record into audit data blocks on an audit trail, an audit trail comprising a series of audit trail blocks written by said audit information record manager at a rate directly proportional to how many Steps occur, and wherein a periodic save (P-SAVE) audit trail record is written to said audit trail at a predefined periodic rate, said periodic save audit trail record comprising all Step ID's codes or names that are not completed by said step table and processor during each said period, and said periodic save audit trail record further comprising an address within said audit trail of a prior P-SAVE audit trail record.

9. The system of claim 8 wherein said address comprises a file identifier address or an audit block address.

10. The system of claim 9 wherein said address further comprises a device type into which said P-SAVE audit trail record was saved.

11. The system of claim 8 wherein said address comprises a tape address and an audit block address.

12. The system of claim 8 wherein said address further comprises a time stamp of said prior P-SAVE.

13. The system of claim 8 wherein said address comprises a disk address and F-cycle or file identifier number.

14. Executive program manager for use in a computer system, for initiating a recovery program that recovers from failures in said computer system by referent use of an audit trail system wherein said audit trail system stores audit data in audit trail blocks in a data storage system having write forward and read back capacity controlled by a data controller device, said manager having a quick backward trail location system wherein a last previously written P-SAVE location address is in each P-SAVE data block on said audit trail, and wherein Step IDs for each currently open Step are also in each P-SAVE data block, said quick backward trail location system comprising:

an evaluation program (701) for managing a memory area (702) of said computer system for storing any active Step IDs therein, and for generating an initiate recovery signal (703) and terminating its own execution as soon as there are no active Step IDs in said memory area, wherein said evaluation program begins execution (704) by storing all active Step IDs found (705) in a last written P-SAVE record into said memory area (702) and deactivates each said active Step ID as a copy of each said active Step ID is not found in each previously written P-SAVE data block, and an audit trail reading means (705) for locating said last written P-SAVE record and previous last written P-SAVE records, and for reading Step ID data into said memory area (702) from each said P-SAVE data blocks, until said initiate recovery signal is generated.

15. The program manager of claim 14 further comprising means for causing an audit trail data controller to go directly to an address of a previous to the last P-SAVE record.

16. The program manager of claim 14 wherein said audit trail reading means further comprises means for reading a P-SAVE address from a yet to be linked P-SAVE.

17. A method for creating an audit trail for use in a computer system having a control program that maintains records and provides user access to such records in Steps wherein said Steps may be opened to access one of the records and closed when such access is completed the method comprising:

monitoring for the occurrence of said opening and closing of said Steps by said control program, upon the opening of each Step, generating a Step ID and activating said Step ID into a Step ID memory area, upon the closing of each Step, deactivating said Step ID from said Step ID memory area, running a period timing program for periodically, said program steps comprising;
   initiating a Periodic Save (P-SAVE) and noting an audit trail address into which said P-Save is being saved and storing it in a last P-SAVE memory location, and
   writing a P-SAVE record to said audit trail during said P-SAVE, said writing step comprising;
      saving a previously saved audit trail address from said last P-SAVE memory location, and
      saving all Step IDs currently in said Step ID memory area.

18. The method of claim 17 wherein said activating of a Step ID comprises;
   generating an identifier for the opened Step and storing it in said memory area.

19. The method of claim 18 wherein said deactivating of a Step ID comprises;
   deleting the closed Step's Step ID from said memory area.

20. A method for creating an audit trail for use in a computer system having a control program that maintains records and provides user access to such records in Steps wherein said Steps may be opened to access one of the records and closed when such access is completed the method comprising:
   monitoring for the occurrence of said opening and closing of said Steps by said control program,
   upon the opening of each Step, generating a Step ID and activating said Step ID into a Step ID memory area,
   upon the closing of each Step, deleting said Step ID from said Step ID memory area,
   running a period timing program for periodically, said program steps comprising;
      initiating a Periodic Save (P-SAVE) and noting an audit trail address into which said P-Save is being saved and storing it in a last P-SAVE memory location, and
      writing a P-SAVE record to said audit trail during said P-SAVE, said writing step comprising;
         saving a previously saved audit trail address from said last P-SAVE memory location, and
         saving all Step IDs currently in said Step ID memory area.

\* \* \* \* \*